United States Patent
Huang et al.

(10) Patent No.: US 6,304,302 B1
(45) Date of Patent: Oct. 16, 2001

(54) LIQUID CRYSTAL DISPLAY SYSTEM AND LIGHT PROJECTION SYSTEM

(75) Inventors: Junejei Huang; Fang-Chuan Ho, both of Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 09/256,951

(22) Filed: Feb. 24, 1999

(30) Foreign Application Priority Data

May 26, 1998 (TW) .............................. 87108197 A

(51) Int. Cl.[7] .......................... G02F 1/1335; G03B 21/00
(52) U.S. Cl. .................................................. 349/9; 353/31
(58) Field of Search ....................... 349/5, 9, 95; 353/20, 353/31, 33; 359/487

(56) References Cited

U.S. PATENT DOCUMENTS

| | | | | |
|---|---|---|---|---|
| 5,575,548 | * | 11/1996 | Lee ........................................... | 353/31 |
| 5,729,306 | * | 3/1998 | Miyake et al. ............................ | 349/9 |
| 5,812,223 | * | 9/1998 | Noguchi .................................... | 349/9 |
| 6,010,221 | * | 1/2000 | Maki et al. ............................... | 349/8 |
| 6,042,234 | * | 3/2000 | Itoh .......................................... | 353/20 |
| 6,130,728 | * | 2/2000 | Tsujikawa et al. ....................... | 349/9 |

* cited by examiner

*Primary Examiner*—Toan Ton
(74) *Attorney, Agent, or Firm*—Thomas, Kayden, Horstemeyer & Risley, LLP

(57) ABSTRACT

A projection system used in a liquid crystal display (LCD) system is provided. The projection system has a light source, a polarization set which further includes a double dove prism, a vertical prism and a half-wave plate, a polarization beam splitter (PBS), a dichroic prism, and a projection lens. The light source emits a white light, which enters the polarization set and is split into a P-state polarized blue light and a mixed light. The mixed light includes an S-state polarized red light and an S-state polarized green light. The PBS allows the P-state polarized blue light to transmit and enter onto a blue light LCD panel, and deflects the mixed light by 90°. The dichroic prism splits the S-state polarized red light and the S-state polarized green light of the mixed light, which respectively enter a red light LCD panel and a green light LCD panel. The projection lens collects light from the red, green, blue LCD panels and project the lights onto a screen.

14 Claims, 5 Drawing Sheets

LIQUID CRYSTAL DISPLAY SYSTEM AND
LIGHT PROJECTION SYSTEM

CROSS-REFERENCE TO RELATED
APPLICATION

This application claims the priority benefit of Taiwan application serial no. 87108197, filed May 26, 1998, the full disclosure of which is incorporated herein by reference.

BACKGROUND OF THE INVENTION

1. Field of the Invention

This invention relates to an electronic optical system, and more particularly to a light projection system suitable for a use in a liquid crystal display system (LCD) to display image.

2. Description of Related Art

Recently, a LCD device is widely used in TV, computer, monitor or other display system. Comparing with a conventional display apparatus with a picture tube, the LCD system is lighter and has a smaller dimension. It becomes a necessary part to display system, such as a notebook computer.

FIG. 1 is a structure diagram, illustrating a polarization light projection system used in a reflection-type color display board as disclosed by U.S. Pat. No. 5,530,489. In FIG. 1, a reading light source 100 can emit a white light. The white light is polarized by a polarization beam splitter (PBS) 102 and split into an S-state polarized beam and a P-state polarized beam, both which are also reflected so that both light polarized beams are deflected by 90 degrees. The S-state polarized beam forms the WS beam. The P-state polarized beam is converted into an S-polarization beam WS' through a half-wave plate 106. The WS and WS' beams are incident to a polarization analyzer 108 and are deflected by 90 degrees again, in which the polarization analyzer 108 further ensures that the Ws and the WS' beams are polarized into an S polarized state.

The WS and the WS' beams enter a dichroic prism 110, which deflects a blue light BS of the WS and WS' beams by 90° and allows a red light RS and a green light GS to continuously transmit. The blue light BS passes a light path compensation plate 112 and enters a blue liquid crystal light valve (LCLV) 114, which converts the blue light BS into a blue light BP with P-state polarization and reflect the blue light BP back to the dichroic prism 110 through the light path compensation plate 112. The blue light BP is deflected to a projection lens 122 through the polarization analyzer 108. The projection lens 122 project the blue light BP onto an image screen (not shown). For the red light RS and the green light GS, they continuously travel to a color filter prism 116, which deflects the green light GS by 90° into a red LCLV 118, and allows the red light RS to pass and reach a green LCLV 120. The red LCLV 118 reflects the green light GS back and converts it into a green light GP with P-state polarization. Similarly, the green LCLV 120 reflects the red light GS back and converts it into a red light GP with P-state polarization. The red light RP and the green light GP are also deflected to the projection lens 122 and projected to the image screen like the blue light BG.

In this system shown in FIG. 1, the system includes two light splitters and several prisms, resulting in a large system dimension. This display system cannot be efficiently applied in a large displaying area and is not portable. Moreover, a poor focusing quality severely occurs due to a too large distance between the LCLVs and the projection lens. This further limits its applications.

Another system is disclosed by U.S. Pat. No. 5,153,752 to reduce the distance of the projection lens and the system dimension. FIG. 2 is a structure diagram, illustrating a polarization light projection system used in a reflection-type color display board as disclosed by U.S. Pat. No. 5,153,752. In FIG. 2, a light source 200 can emit a white unpolarized light S+P, which enters a PBS 201 and is split into an S-state polarized beam S1 and a P-state polarized beam P2. The S-state polarized beam S1 is deflected by 90° and enters a dichroic prism set 204, which includes several dichroic prisms 204a, 204b, 204c, and 204d. After passing the dichroic prism set 204, the S-state polarized beam S1 are split into a red light RS, a green light GS, and a blue light BS, which respectively travel to LCD panels 205R, 205G and 205B. The LCD panels 205R, 205G and 205B respectively convert the red light RS, the green light GS, and the blue light BS into a red light RP, a green light GP, and a blue light BP with P-state polarization, and reflect the lights RP, GP, and BP onto a projection lens 206, which projects passing light onto a screen (not shown).

For the P-state polarized beam P2, as it passes the PBS 201, it enters a half-wave plate 202 and is polarized to an S-state polarized beam S2. The S-state polarized beam S2, similar to the S-state polarized beam S1, is reflected by the LCD panels 205R, 205G and 205G and reach the screen at the end.

In this conventional projection system of FIG. 2, the dimension and the light focusing issues of the conventional projection system of FIG. 1 is reduced. However, since the system of FIG. 2 is very complicate, production yield rate is low and fabrication cost is high. Moreover, since several prisms are used in the system, a little misalignment may cause a large error. Its requirement of alignment precision is much higher that a usual level.

SUMMARY OF THE INVENTION

It is at least an objective of the present invention to provide a LCD system, particularly suitable for a color LCD system. The LCD system includes a projection system with a denser layout so that system dimension and back focal length are effectively reduced. A light path needs no a complicate reflection set so that there is no need of high alignment precision. Fabrication cost is also effectively reduced.

In accordance with the foregoing and other objectives of the present invention, a projection system used in a LCD system is provided. The projection system includes a light source, a polarization set which further includes a double dove prism, a vertical prism and a half-wave plate, a polarization beam splitter (PBS), a dichroic prism, and a projection lens. The light source emits a white light, which enters the polarization set and is split into a P-state polarized blue light and a mixed light. The mixed light includes an S-state polarized red light and an S-state polarized green light. The PBS allows the P-state polarized blue light to transmit and enter onto a blue light LCD panel, and deflects the mixed light by 90°. The dichroic prism splits the S-state polarized red light and the S-state polarized green light of the mixed light, which respectively enter a red light LCD panel and a green light LCD panel. The projection lens collects lights from the red, green, blue LCD panels and project the lights onto a screen.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

The conventional projection system used in a LCD system includes issues of, for example, large dimension, poor focusing quality, complicate system, or high fabrication cost. The invention introduces a projection system used in a LCD system so as to at least solve the above issues.

Figure 1:
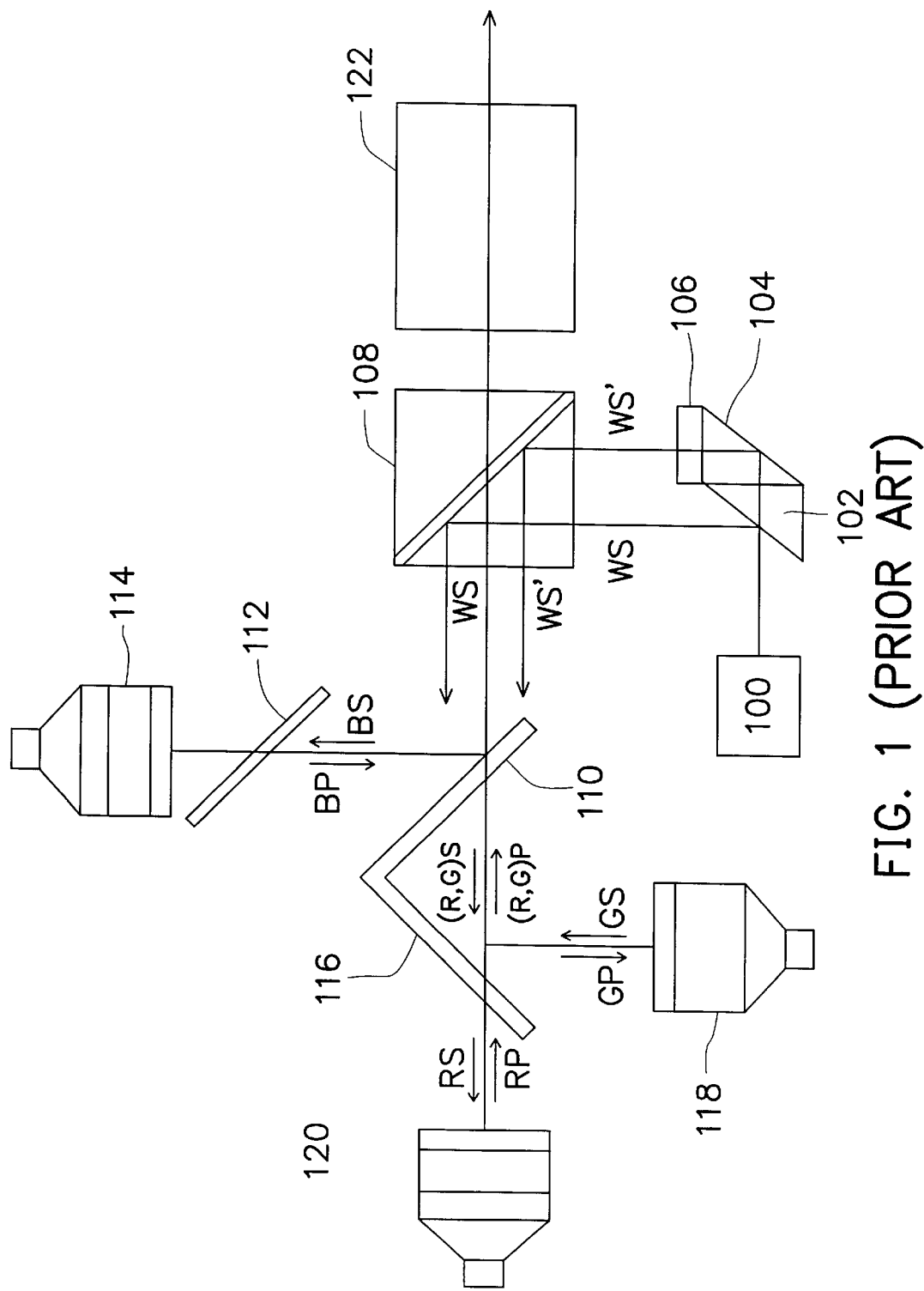
FIG. 1 is a structure diagram, illustrating a polarization light projection system used in a reflection-type color display board as disclosed by U.S. Pat. No. 5,530,489.
Figure 2:
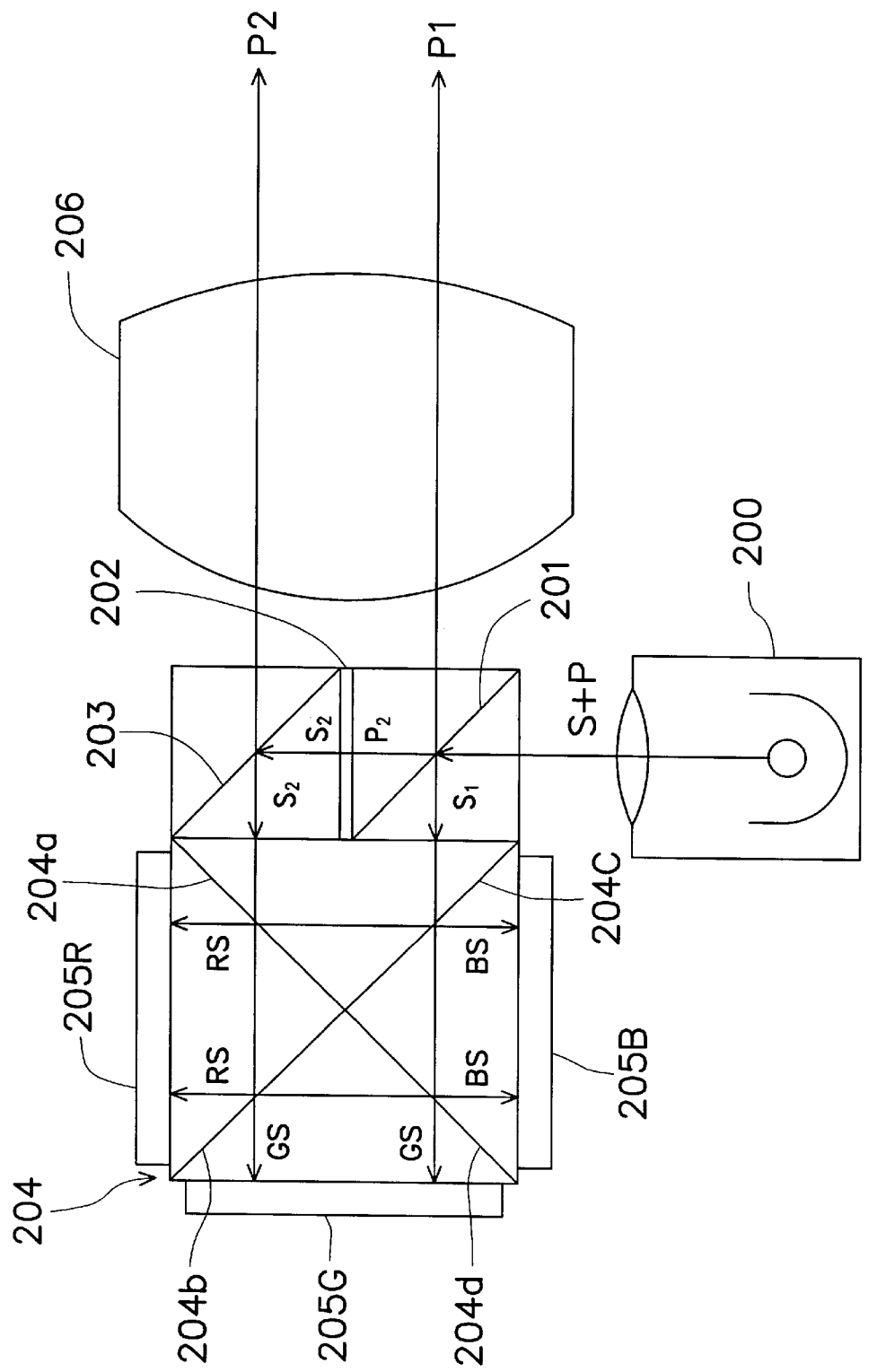
FIG. 2 is a structure diagram, illustrating a polarization light projection system used in a reflection-type color display board as disclosed by U.S. Pat. No. 5,153,752.
Figure 3:
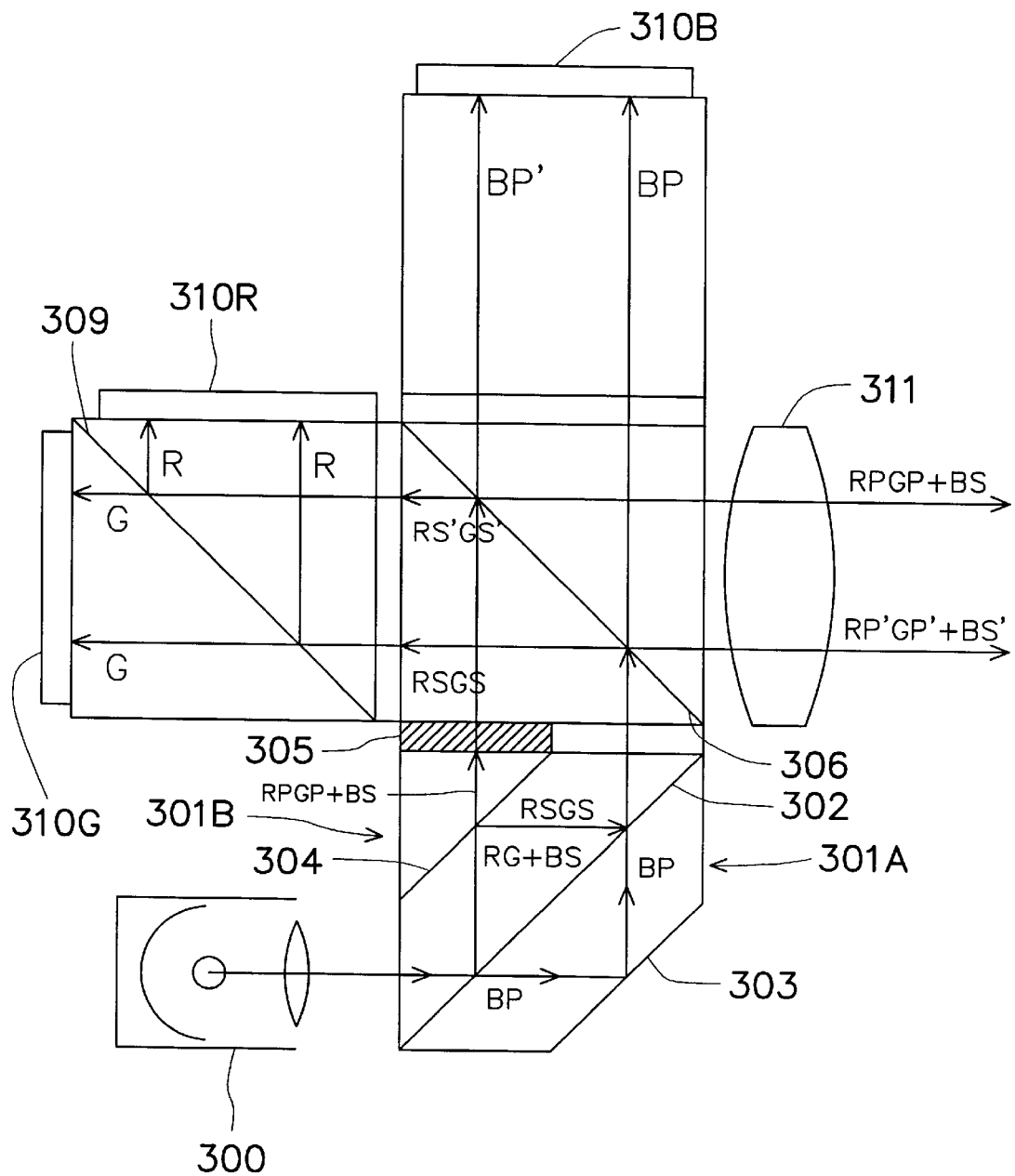
FIG. 3 is a structure diagram, schematically illustrating a polarization light projection system using reflection-type LCD panels, according to a preferred embodiment of the invention.

FIG. 3 is a structure diagram, schematically illustrating a polarization light projection system using reflection-type LCD panels, according to a preferred embodiment of the invention. In FIG. 3, a greatly simplified projection system is designed so that dimension is greatly reduced, a back focal length is also reduced. The system has a large tolerance of misalignment. Fabrication cost is also reduced.

The projection system of the invention includes a light source 300, a double dove prism 301A, a vertical prism 301B, a half-wave plate 305, a polarization beam splitter (PBS) 306, a color filter prism 309, and a projection lens 311. The double dove prism 301A further includes optical films 302 and 304, in which the optical film 302 behaves as a PBS for blue light but behaves as a dichroic mirror for red light and green light. The light source 300, such as a lamp, emits a light, such as a white light, which is incident on the optical film 302. A red light R and a green light G of the white light are reflected and a blue light B is split into a blue light BS with S-state polarization and a blue light BP with P-state polarization. The blue light BS is also reflected by the optical film 302 so as to form a mixed light RG+BS.

The blue light BP continuously travels to a reflection mirror 303 so that the blue light BP is deflected by 90°, travelling in parallel to the mixed light RG+BS. The blue light BP then directly travels to a blue LCD panel 310B through the optical film 302 and the BPS 306.

The mixed light RG+BS resulting from the optical film 302 keep travelling to the optical film 304, which behaves as a PBS for red light and green light but behaves as a dichroic mirror for blue light. So, the red/green light RG of the mixed light RG+BS is split into a red/green light RPGP with P-state polarization and a red/green light RSGS with S-state polarization. The red/green light RPGP continuously travels in the same direction but the red/green light RSGS is deflected by 90° onto the optical film 302. Due to the property of the optical film 304, the blue light BS just transmits the optical film 304 and combines with the red/green light RPGP to form a mixed light RPGP+BS, which enters the half-wave plate 305 through the vertical prism 301B. The purpose of the vertical prism 301B is used to compensate a corner of the double dove prism 301A to form a box corner for easy assembling. The half-wave plate 305, for example, located on the vertical prism 301B so as to only allow the mixed light RPGP+BS to pass. The half-wave plate 305 changes polarization state of passing light so that the red/green light RPGP is converted into a red/green light RS'GS' with S-state polarization, and the blue light BS is converted into a blue light BP'. The blue light BP' travels to the blue LCD panel 310B through the PBS 306 but the red/green light RS'GS' is deflected by the PBS 306 by 90° onto the dichroic prism 309.

As the red/green light RSGS is incident on the optical film 302, it is deflected again by 90° so that the red/green light RSGS is reflected to the PBS 306, which deflects the red/green light RSGS again. As a result, the red/green light RS'GS' and the red/green light RSGS do travel in parallel and both enter the dichroic prism 309. The red/green light RS'GS' and the red/green light RSGS are respectively split by the dichroic prism 309 into a green-content light G and a red-content light. The red-content light R travels to a red LCD panel 310R, and the green-content light G travels to a green LCD panel 310G. All the red LCD panel 310R, the green LCD panel 310G, and the blue LCD panel 310B respectively reflect incident lights back along the same light path to the PBS 306, in which all polarization states are inverted also. Through the PBS 306, a mixed light RPGP+BS and a mixed light RP'GP'+BS' therefor are formed and travel to the projection lens 311. The projection lens 311 can project incident light onto a screen (not shown).

Figure 4:
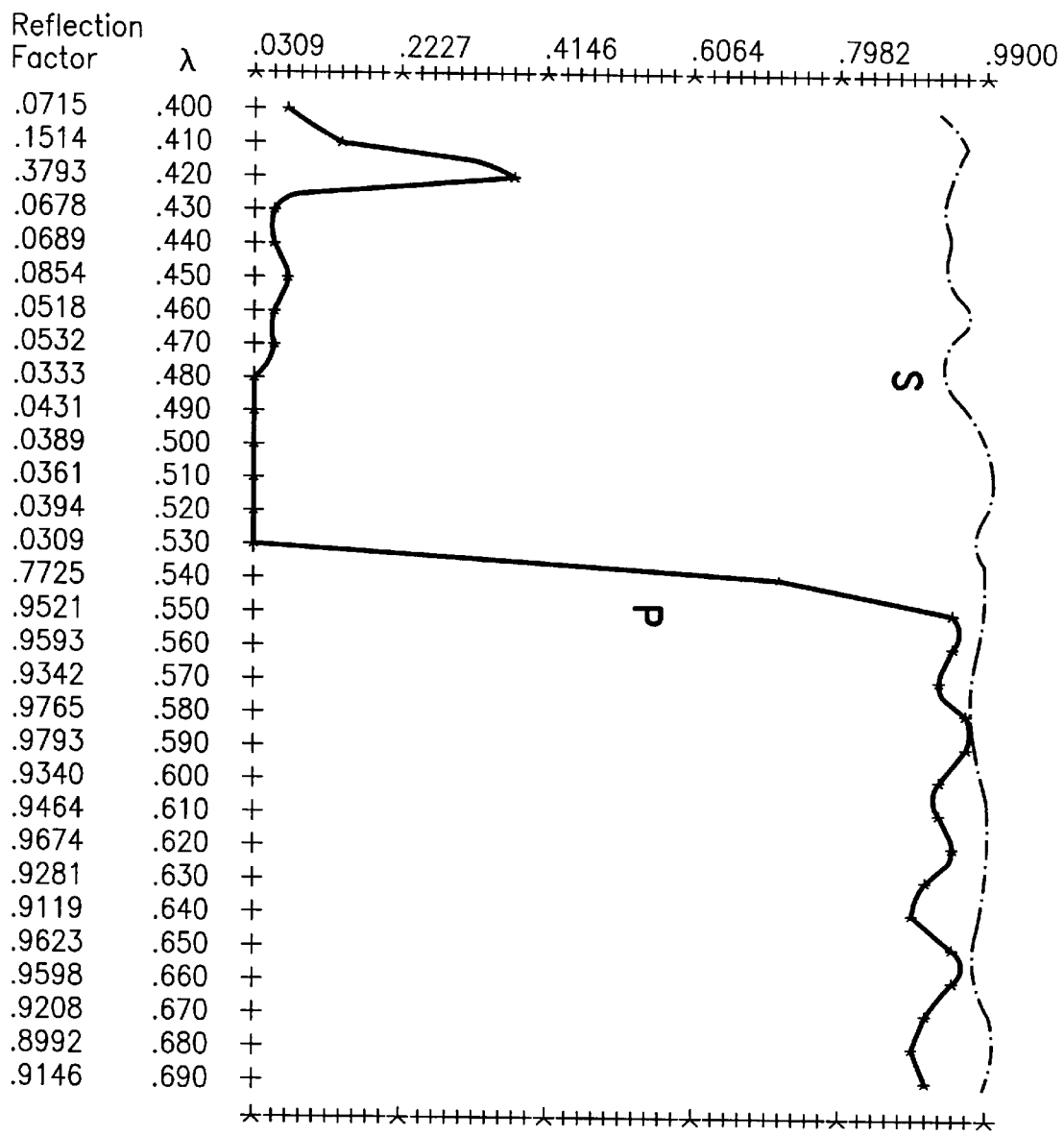
FIG. 4 is a reflection factor distribution, schematically illustrating a reflection spectrum of the optical film 302 in FIG. 3.
Figure 5:
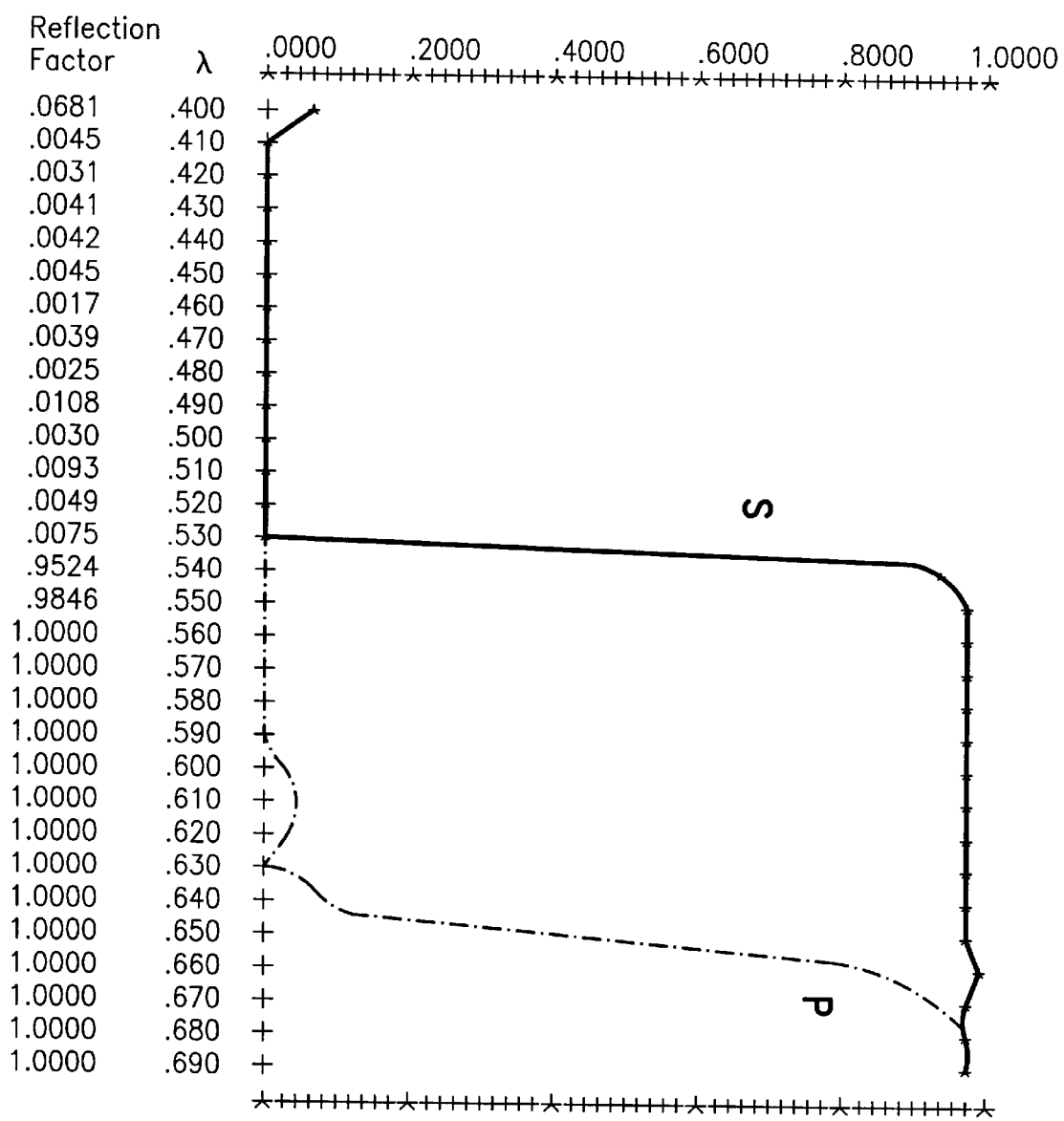
FIG. 5 is a reflection factor distribution, schematically illustrating a reflection spectrum of the optical film 304 in FIG. 3

In this projection system of the invention, the optical film 302 can be formed to include, for example, a stacked-layer structure by alternatively depositing layers of materials with high and low refractive indices as listed in Table 1. Similarly, the optical film 304 can also be formed, for example, like the optical film 302 with two different film materials as listed in Table 2. Their reflection factors are shown in FIG. 4 and FIG. 5. FIG. 4 is a reflection factor distribution, schematically illustrating a reflection spectrum of the optical film 302 in FIG. 3. FIG. 5 is a reflection factor distribution, schematically illustrating a reflection spectrum of the optical film 304 in FIG. 3. An incident angle is 45° so as to deflect light by 90°. Each S and P curves in FIG. 4 and FIG. 5 respectively represent an S-state polarized light and a P-state polarized light. An observable range of wavelength ($\lambda$) is, for example, about between 400 nm and 690 nm. Both the optical films 302 and 304 may also be formed by deposition of more than two film materials. For example, some layers with medium refractive index may be further included in the stack-layer structure of the optical films 302 and 304.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A projection system with a liquid crystal display (LCD) system, the projection system comprising:
   a light source, used to emit a light beam;
   a double-dove-prism set, used to split the light beam into a first blue light BP with P-state polarization and a mixed light, wherein the mixed light comprises a red/green light with S-state polarization and a second blue light BP' with P-state polarization;

a polarization beam splitter (PBS), used to accept the first blue light BP and the mixed light, in which the PBS allows any passing light with P-state polarization to continuous travel through without deflection but deflects any passing light with S-state polarization;

a dichroic prism, used to intercept the mixed light and split a deflected constituent of the mixed light into a polarized green light and a polarized red light;

a red LCD panel, a green LCD panel, and a blue LCD panel, respectively used to reflect the polarized red light, the polarized green light, and both the first blue light BP and the second blue light BP' back to the PBS with inverted polarization state, in which the first blue light BP and the second blue light BP' respectively become a blue light BS and a second blue light BS'; and a projection lens, used to collect the polarized red light, the polarized green light, and both the first blue light BS and the second blue light BS', and project them onto a desired direction.

2. The projection system of claim 1, wherein the double-dove-prism set comprises:

a double dove prism, which further comprises a first optical film, a second optical film parallel to the first optical film, and a reflection mirror, wherein the first optical film behaves like a PBS for blue light constituent and behaves like a dichroic mirror for red/green light constituent and the second optical film behaves like a PBS for red/green light constituent and behaves like a dichroic mirror for blue light constituent;

a vertical prism, used to compensate the double dove prism to form a box corner; and a half-wave plate, located on the vertical prism so as to change a polarization state of any passing light.

3. The projection system of claim 2, wherein the double-dove-prism set comprises a light path so as to produce the first blue light BP and the mixed light, in which the light path structure comprises that:

as the light beam enters the double dove set, the first optical film splits the light beam into the first blue light BP which is further deflected by the reflection mirror without passing the half-wave plate, and a first mixed light RG+BS which is deflected by the first optical film onto the second optical film;

the second optical film splits the first mixed light RG+BS into a second mixed light RPGP+BS without deflection and a third mixed light RSGS with deflection;

the third mixed light RSGS is deflected out of the double-dove-prism set by the first optical film without passing the half-wave plate;

the second mixed light RPGP+BS passes the vertical prism and the half-wave plate and becomes a fourth mixed light RS'GS'+BP', in which BP' represents the second blue light and polarization states are inverted due to the half-wave plate so that the original mixed light includes the fourth mixed light RS'GS'+BP', the first blue light BP, and the third mixed light RSGS, all of which are split and accordingly deflected by the PBS.

4. The projection system of claim 3, wherein each time of light deflection in the projection system comprises substantially deflecting passing light by 90°.

5. The projection system of claim 3, wherein the first optical film comprises a first stacked-layer structure.

6. The projection system of claim 5, wherein the first stacked-layer structure comprises at least two different optical film materials with different refractive indices.

7. The projection system of claim 5, wherein the first optical film is at least suitable for at range of wavelength between about 400 nm and 690 nm.

8. The projection system of claim 3, wherein the second optical film comprises a second stacked-layer structure.

9. The projection system of claim 8, wherein the second stacked-layer structure comprises at least two different film materials with different refractive indices.

10. The projection system of claim 8, wherein the second optical film is at least suitable for at range of wavelength between about 400 nm and 690 nm.

11. The projection system of claim 1, wherein each time of light deflection in the projection system comprises substantially deflecting passing light by 90°.

12. The projection system of claim 1, wherein the green LCD panel and the red LCD panel are properly mounted on the dichroic prism so as to reduce a reflection distance.

13. The projection system of claim 1, wherein the light source comprises a lamp.

14. The projection system of claim 1, wherein the light beam comprises a white light beam.

* * * * *